May 14, 1929.   F. SÜBERKRÜB   1,713,406
PADDLE WHEEL FOR STEAMERS
Filed April 23, 1928   2 Sheets-Sheet 1

Inventor:
F. Süberkrüb,
By
Attys

Inventor:
F. Süberkrüb

Patented May 14, 1929.

1,713,406

UNITED STATES PATENT OFFICE.

FRANZ SÜBERKRÜB, OF HAMBURG, GERMANY.

PADDLE WHEEL FOR STEAMERS.

Application filed April 23, 1928, Serial No. 272,295, and in Germany October 6, 1927.

As is understood, the speed of paddle wheels for steamers is limited, for the reason that when a given speed is exceeded an excessive volume of air is entrained in the wake of the blades, preventing the surrounding water from flowing in with sufficient rapidity to fill the void behind the blade so that the succeeding blade encounters a mass of mixed air and water, thus diminishing the resistance of the water to the blade, reducing the efficiency of the paddle wheel. This lack of efficiency is the more noticed the more rapidly the paddle wheel is rotated. By way of example on river steamers of 1300 H. P. or so the paddle wheels, having a diameter of 3½ metres and blades of a breadth of 1 metre and a depth of immersion of 1.3 metres are limited to a speed of but 33 revolutions per minute on account of the cavitation arising at higher speeds.

The object of the invention is to construct a paddle wheel of the type which works with only a segmental portion thereof submerged which may be given a higher circumferential speed than was heretofore practicable without reduction in its efficiency.

Whereas in known paddle wheels the following up of the water to the rear of the blades is prevented, for the reason that the blades work at or near the water level, and thus draw air from the surface into the void behind the blades, according to the present invention the blades are so guided that on dipping into or entering the water their faces are adjusted approximately tangentially to the periphery of the wheel, so that they cut the current induced by the forward motion of the vessel at such an angle that they cannot perform work and that they only gradually come into radial position and perform propulsive work when immersed to such a depth that the column or layer of water above the upper edge of the blade is deep enough to be impenetrable by the surface air. The entrainment of air may be further prevented by making the blades of comparatively small breadth. The breadth should not exceed 55% of the depth of immersion. The result will be that the blades can be pulled through the water with a greater speed, and thus the circumferential speed of the paddle wheel may be considerably increased, it being known that the resistance offered to the blades by the water increases with the square of the speed.

When the water is so shallow that the blades cannot work at such a depth that there would be a sufficient column of water above to be impenetrable to air, further provision is made to prevent entrainment of air. According to the invention there is arranged at a slight depth below the water level a horizontal cover plate through slots or gaps in which the blades pass down at the forward end and up again at the outer end, means being preferably provided for closing the slots more or less after each blade has passed and for opening them again when the next following blade approaches.

To prevent air from entering from the sides of the wheel the cover plate may be connected with segmental vertical plates at both sides and concentric therewith arcuate segments fixed to the paddle box, so that air cannot penetrate the water flowing under the horizontal cover plate.

The horizontal cover plate may be of such form that it serves to guide the water passing to the paddles, as will be more fully explained below.

The intermediate section of the cover plate section is suspended from the paddle wheel shaft, and connected with a sun wheel loose on the said shaft, while on the boss of the paddle wheel or blade-carrying disk is mounted one or more shafts carrying one or more planetary wheels engaging with said sun-wheel, said last-mentioned shafts carrying a second set of planetary wheels engaging a second sun-wheel of the same size as the first sun wheel and fixed to the hull of the ship.

In the accompanying drawings Fig. 1 is an elevation of a paddle wheel constructed according to the present invention, the paddle box being shown in section.

Figure 3:
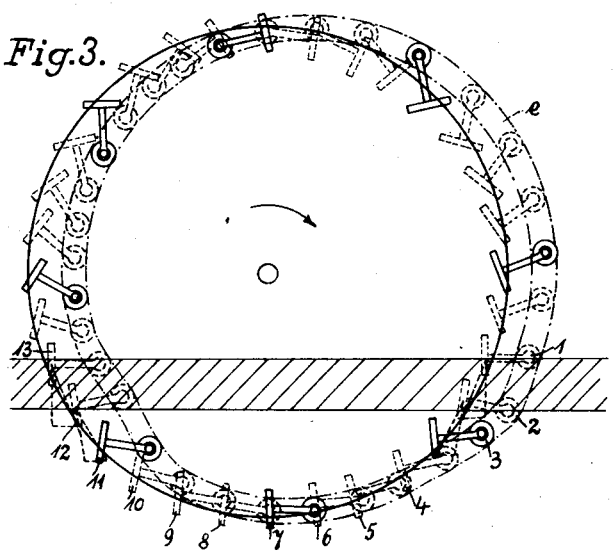
Fig. 3 illustrates the various positions of a float about the circumference of the wheel.
Figure 4:
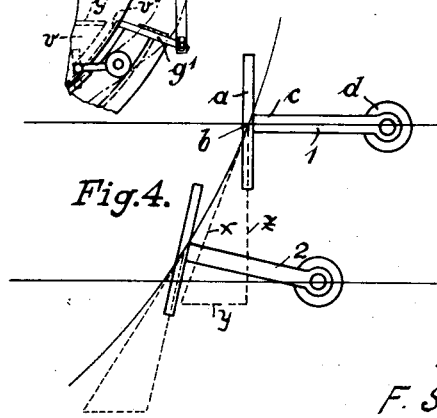
Fig. 4 is an enlargement of that part of Fig. 3 where the float dips into the water.

Referring to the drawings, the blades $a$ are individually guided, there being fixed to the pivot $b$ of each blade $a$ an arm $c$ carrying at its outer end a roller $d$ tracking a cam groove $e$ on the hull $f$ of the ship. As will be seen from Figs. 3 and 4, the groove is so shaped that on entering the water the face of the blade is approximately tangential to the periphery of the wheel. If the circumferential speed of the paddle wheel be $x$, Fig. 4, and the speed of the ship be $y$, then the resultant $z$ represents the direction in which the blade can pass through the water without doing work. Such idle movement of the blade is maintained until the float is immersed to a depth beyond which air cannot penetrate. Beginning at this point the blade is so guided that it performs work in propelling the vessel. The positions between which the blade does no work on entering the water are indicated by 1 and 2; in the position 3 (Fig. 3) the blade is so guided by the cam that it begins to be operative. By degrees the blade turns into the radial position indicated at 7, in which the blade may be vertical. At this point the efficiency is at a maximum. At the positions 11, 12 and 13 before leaving the water the blade is again so adjusted that no work is done and no water to speak of will be thrown into the air.

Figure 1:
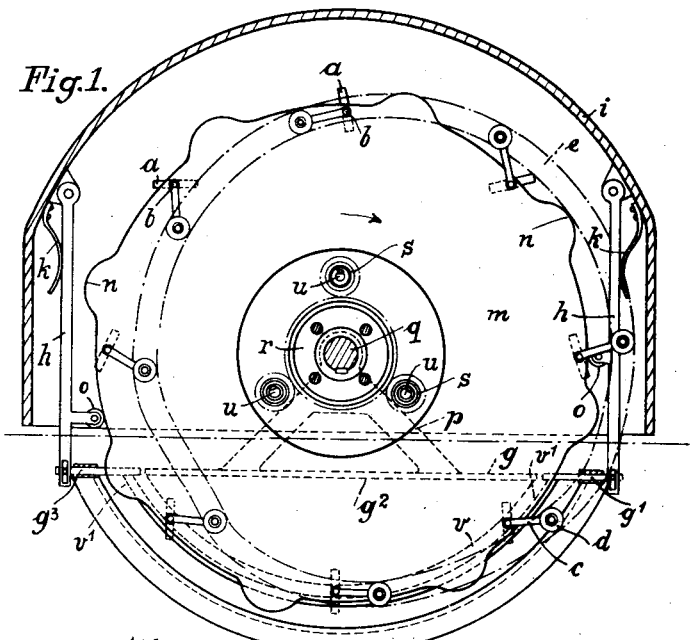
Figure 2:
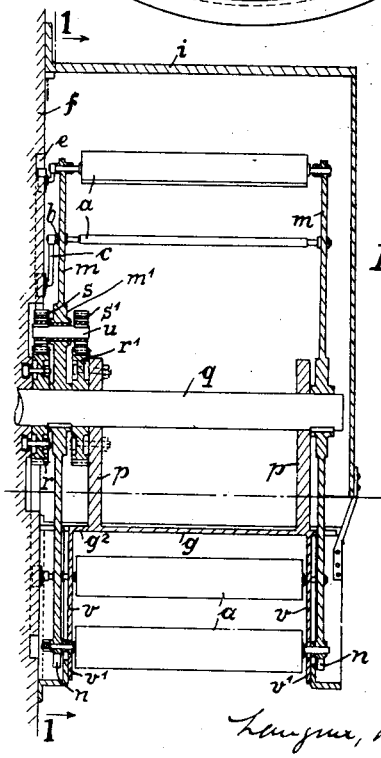
Fig. 2 is a cross-section of the paddle wheel shown in Fig. 1.

If the steamer is to be navigated in very shallow water, so that there is only very little depth of water for the blade to operate in, provision must be made to render the blade effective even in shallow water. To this end the invention contemplates the use of a horizontal cover plate $g$ which is preferably made in three sections $g'$, $g^2$ and $g^3$, of which sections $g'$ and $g^3$ are arranged outside and $g^2$ inside the wheel below the water level. The cover plate protects the water from penetration by the surface air to the depth at which the blades are to perform work. It is of advantage to close the gaps between the sections $g'$ and $g^2$ and between the sections $g^2$ and $g^3$ the moment a blade has passed and to reopen the gaps when another blade approaches the same to permit the passage of the other blade. The movement of the said sections may be effected in any convenient manner. In the construction shown in Figs. 1 and 2 the sections $g'$ and $g^3$ are suspended on vertical rods or arms $h$ connected to pivots on the paddle box $i$. Springs $k$ fitted to the paddle box bear yieldingly against the arms $h$ to press them against the rim of the disc $m$, thus normally closing the gaps between the sections $g'$ and $g^3$ and between the sections $g^2$ and $g^3$. Cams $n$ on the periphery of the disc $m$ at suitable distances from the axes of the blades co-operate with rollers $o$ on the arms $h$, to move the arms in opposition to the springs $k$ whereby the section $g'$ or $g^3$ respectively is moved away from the section $g^2$ when the gap is to be opened to allow the blade to pass.

The inner section $g^2$ is mounted on arms $p$ which hang loosely on the shaft $q$ of the paddle wheel. Fixed to one arm $p$ and also loose on the shaft $q$ is a toothed wheel $r'$ (Fig. 2) constituting the sun wheel of a planetary gearing and co-operating with one or more planetary wheels $s'$, the shafts $u$ of which are rotatably journalled in the boss $m'$ of the paddle wheel or in one of the discs $m$. The shafts $u$ carry on the other side of the disc $m$ a second set of planetary wheels $s$ co-operative with a second sun-wheel $r$ fixed to the hull $f$ of the ship. The sun-wheel $r$ being fixedly mounted, the sun wheel $r'$ must also remain at rest and consequently the plate $g^2$ is held stationary.

It is of advantage to provide means for preventing the penetration of air to the blades from the side if the depth of immersion is very small. With this object in view, vertical cover plates are provided on the inside as well as the outside. The inner vertical plates are shaped as segments $v$ fixed to the plate $g^2$ at right angles thereto, the lower edge of each segment being concentric with the paddle wheel. The arcuate plates $v'$ outside the wheel are connected to the hull $f$ of the ship or to the paddle box $i$, respectively, in any suitable manner. By means of these vertical plates the entrance of air from the side is effectively prevented.

Figure 5:
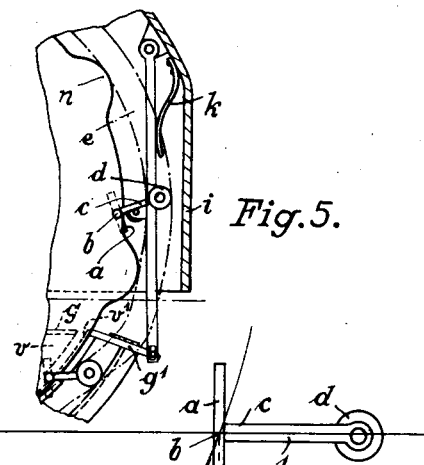
Fig. 5 illustrates a modified detail.

The horizontal cover plates may be so constructed that they serve as guides for the water passing to the floats when in operation. Owing to the waves created by the ship as well as by the rotation of the paddle wheel the water does not flow exactly parallel to the floats in the plane of the water line and therefore the efficiency of the floats is diminished. In order to increase the efficiency the cover plate $g$ or sections thereof are given such inclination that they serve as guides. Fig. 5 illustrates a modification in which the outer cover plate sections are suitably inclined. If desired also the inner section $g^2$ may be inclined correspondingly. A cover plate of this description or parts thereof may be even used on slow running paddle wheels for regulating the flow of the water to the floats as described above.

I claim:

1. A paddle wheel characterized by a cover plate intermediate the water line and the operative position of the blades, said plate serving to hold back the air.

2. A paddle wheel according to claim 1, further characterized in that the cover plate is of such a size that it projects from the wheel at the front and at the rear end presents slots allowing the blades to pass.

3. A paddle wheel according to claim 1 further characterized in that the cover plate or parts of the cover plate is or are movable.

4. A paddle wheel according to claim 1 further characterized in that parts of the cover plate are connected with a device which on the approach of the blades moves such parts to allow the blades to pass and then returns them to initial position.

5. A paddle wheel according to claim 1 further characterized in that that part of the cover plate which is arranged within the wheel is provided with segmental plates at right angles thereto, and arcuate cover plates arranged concentric with said segmental plates.

6. An anti-cavitation paddle wheel for steamers, of the type adapted to have only a segmental portion submerged, including submersible feathering blades, and means for changing the angularity of the blades, said means being constructed to position each blade so as to cause it to enter the water in a direction substantially normal to the water surface, said means maintaining each blade in such position as to submerge idly until the depth of water above its upper edge is sufficient to prevent the drawing of air from the surface into the wake of said blade.

7. A paddle wheel of the type adapted to have only a segmental portion thereof submerged, having movable blades, said blades being of such breadth, and the paddle wheel being constructed to carry the blades at such depth, that when the blade is in its lowermost position, the depth of water above the upper edge of the blade is at least equal to the breadth of the blade.

In testimony whereof I have signed my name to this specification.

FRANZ SÜBERKRÜB.